(No Model.)
J. P. LAVIGNE.
SELF HOLDING TIRE FOR BICYCLES.
No. 490,829. Patented Jan. 31, 1893.
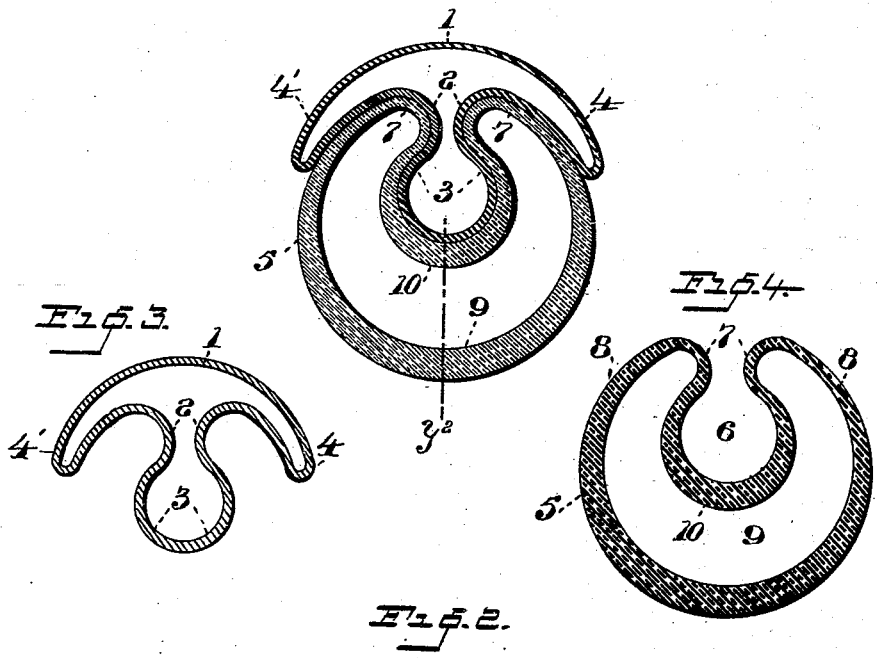
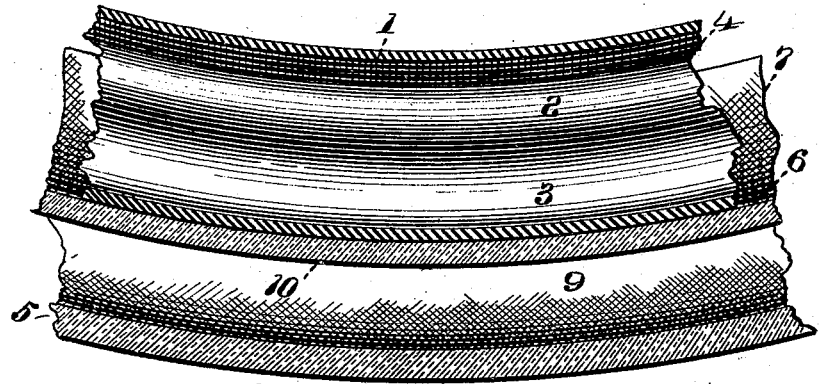

UNITED STATES PATENT OFFICE.

JOSEPH P. LAVIGNE, OF NEW HAVEN, CONNECTICUT, ASSIGNOR OF ONE-HALF TO REUBEN H. BROWN, OF SAME PLACE.

SELF-HOLDING TIRE FOR BICYCLES.

SPECIFICATION forming part of Letters Patent No. 490,829, dated January 31, 1893.

Application filed July 6, 1892. Serial No. 439,163. (No model.)

*To all whom it may concern.*

Be it known that I, JOSEPH P. LAVIGNE, a citizen of the United States, and a resident of New Haven, in the county of New Haven and State of Connecticut, have invented certain new and useful Improvements in Self-Holding Tires for Bicycles, of which the following is a specification.

My invention relates to a self-holding pneumatic tire for bicycles, and it consists in so shaping the bearing surfaces of the tire and rim that when the former is inflated, it will be self sustaining against the latter.

The manner of constructing my said improvement will be more fully described in the following specification and such features as I believe to be new and novel, particularly pointed out in the claims to follow.

To enable others skilled in the art to which my invention belongs, reference is had to the accompanying drawings and to the figures of reference thereon, in which;

Figure 1, represents a vertical transverse section of my improved tire and rim. Fig. 2, broken section and longitudinal central section through $y^2$ of Fig. 1. Fig. 3, is a vertical transverse section of the rim. Fig. 4, vertical transverse section of the pneumatic tire. Figs. 5 and 6 modifications of the rim.

1 represents the tubular rim which is of anchor shape in its cross section having the central shank 2 and curved stock 3, the flukes or arms 4, 4' being also curved shaped.

5 is the pneumatic tire having the depression or pocket 6 in the outer surface extending entirely around the inner periphery of the said tire, which pocket, conforms to the anchor shape of the rim.

For cheapness of construction, as well as strength the rim is made tubular or hollow, as shown in Figs. 1 and 3. It will be understood however that it could be constructed of one solid piece, as shown in Fig. 5, or the curved arms or flukes 4, 4' together with the shank 2, could be closed in as shown in Fig. 6.

The custom heretofore, has been to cement the tire to the rim. This mode of attachment is both unsatisfactory and expensive.

It is often necessary to replace a worn out tire with a new one, or remove a tire temporarily for repairs, or, for the purpose of repairing other parts of the wheel. In which case it is necessary to apply heat to the rim in order to melt the cement. This operation not only ruins the japan work, but the greatest care must be exercised to prevent permanent injury to the rubber tire.

In my improved construction, the tire is made to conform to the anchor like construction of the rim, and when the same is inflated, it will, by reason of the compressed air within the cavity of the tire, be entirely self-sustaining without any other mode of fastening.

The tire is cast or otherwise made to assume the shape shown in Fig. 4, and the rim constructed as shown in Fig. 3.

To attach the tire to the rim, the circular shaped stock 3 is forced into the pocket 6 of the tire, either while the same is empty, partially, or fully inflated. Therefore, it is quite evident, that by reason of the curved limbs 7, pocket 6, and portions 8 of the outer surface of the tire engaging with corresponding curves of the rim, combined with compressed air within the cavity 9 of said tire, that its holding power is greatly increased, especially in traction.

Though the tire should be entirely exhausted, it is evident by reason of the enlarged stock 3 of the rim, it could not fall off, but would require considerable effort applied laterally, to effect its removal. This feature, combined with the fact, that the traction side of the exhausted tire striking against the outer surface 10 of the pocket 6,—projecting within the cavity 9, which is made thicker in that portion—will sustain an exhausted tire and enable the rider to reach home without incurring further injury thereto.

It is quite evident that the shape of the shank 2 and stock 3 of the anchor shaped rim may be somewhat varied, and the depression in the tire made to conform thereto, without departing from the spirit of my invention. Therefore, I do not wish to be held strictly to the form herein shown, but hold myself at liberty to depart therefrom. The gist of my invention being to make the tire self-sustaining, and to employ any form substantially within the scope of my invention to effect such a result.

Having thus described my invention, what

I claim as new and desire to secure by Letters Patent, is;

1. The herein described improvement in bicycle wheels, comprising in combination, a pneumatic tire having in one side a depression or pocket, combined with a rim, anchor shape in its cross section, whose stock or enlarged portion of the shank engages with the pocket of the tire, as described.

2. The herein described improvement in bicycle wheels, comprising in combination, a pneumatic tire having a grooved depression formed in its upper surface, and extended within the cavity of the tire, and circumferential therewith, a rim, having a raised projection on its outer curved surface to fit the depression in the tire, substantially as described.

3. The herein described improvements in bicycle wheels comprising in combination the pneumatic tire 5, having the grooved depression 6 enlarged at the bottom and formed in the outer surface thereof, such depression extending within the cavity of the tire, and circumferential therewith; rim 1 anchor shape in cross section, to engage with the depression of the tire, reduced shank 2 to engage with limbs 7 of said tire, the outer circle of said rim also engaging with a portion of the outer surface of the tire, all combined and arranged with the compressed air within the tire so that said tire is sustained to the rim, substantially as shown.

4. The herein described improvement in bicycle wheels, comprising in combination a tubular rim which is anchor shape in cross section, having a reduced shank and enlarged stock portion projecting outward from the rim proper, a pneumatic tire having a grooved depression enlarged at the bottom to fit the stock of the anchor shaped rim, said depression extending within the cavity of the tire, and circumferential therewith, so that, by reason of the formation of the tire and rim and the compressed air within the tire, the same is firmly sustained to the rim, all substantially as described and for the purpose set forth.

Signed at New Haven, in the county of New Haven and State of Connecticut, this 29th day of June, A. D. 1892.

JOSEPH P. LAVIGNE.

Witnesses:
HARRY W. ASHER,
LEWIS ASHER.